May 12, 1931.   R. W. BROWN   1,804,970
PRESSURE MEASURING INSTRUMENT
Filed Oct. 7, 1926
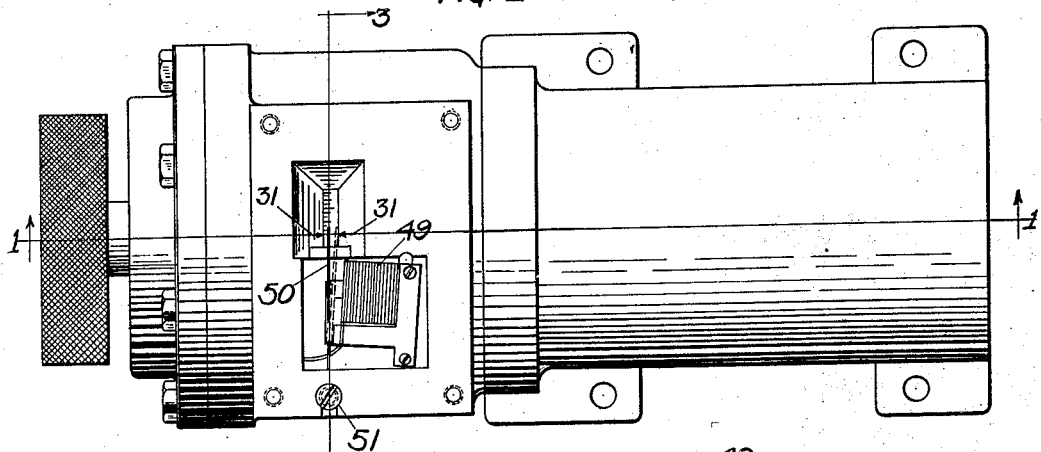
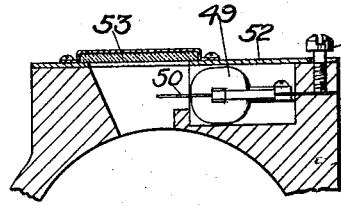
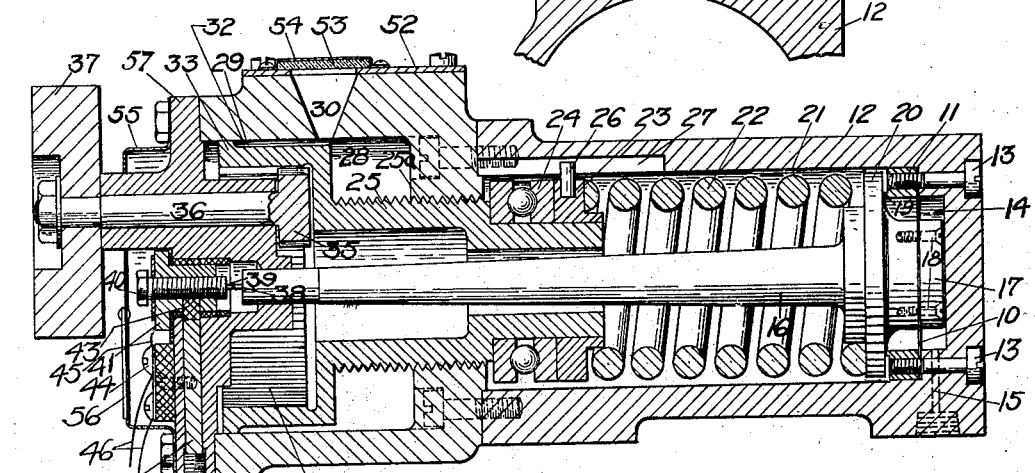
INVENTOR.
Roy W. Brown
BY
ATTORNEY.

Patented May 12, 1931

1,804,970

UNITED STATES PATENT OFFICE

ROY W. BROWN, OF AKRON, OHIO, ASSIGNOR TO THE FIRESTONE TIRE AND RUBBER COMPANY, OF AKRON, OHIO, A CORPORATION OF OHIO

PRESSURE MEASURING INSTRUMENT

Application filed October 7, 1926. Serial No. 139,999.

One object of my invention is to provide a fluid pressure measuring instrument of a high degree of accuracy.

Another object of my invention is to provide a compact and rugged pressure measuring instrument which can be conveniently handled and will not be easily damaged.

One specific purpose of the invention is for improving the pressure measuring apparatus of a portable weighing mechanism having a system of levers, a diaphragm, and a hydraulic system, but the instrument is capable of general application wherever fluid pressures are to be measured.

The above and other objects of the invention are obtained by the construction illustrated in the accompanying drawings and described in detail below. It is to be understood that the invention is not limited to the specific construction shown and described.

Of the accompanying drawings,

Figure 1 is a vertical section through the instrument;

Figure 2 is a plan view of the instrument with the cover plate removed to show the indicating mechanism;

Figure 3 is a partial section on line 3—3 of Figure 2; and

Figure 4 is a diagram illustrating the electrical circuit.

Referring to the drawings, 10 is a diaphragm, the outer edge of which is clamped between ring 11 and housing 12 by screws 13, 13, thus providing a closed fluid chamber 14 which is connected with the fluid pressure to be measured by means of duct 15 and suitable piping (not shown).

The central portion of diaphragm 10 is attached to a movable member 16 by means of plate 17 and screws 18, 18. Ring 11 is provided with a raised portion 19 which limits the movement of member 16 in one direction to prevent excessive distortion of diaphragm 10.

A spring 22 is so arranged that its force when compressed is taken, at one end through flange 20 to diaphragm 10, and at the other end by thrust collar 23, the thrust being taken through ball bearing 24 to sleeve 25 which is threaded in housing 12 at 25ª. Collar 23 is prevented from rotating, as sleeve 25 is turned, by pin 26 which slides in groove 27.

Sleeve 25 has an enlarged portion 28, the outer surface 29 of which is graduated, the graduations being visible through aperture 30 in housing 12. The sides of aperture 30 are provided with indicating arrows 31, 31 at which point the graduations are to be read. The said graduations are so arranged helically around the enlarged portion 28 of sleeve 25, the pitch of said helix being equal to the pitch of threads 25ª, that the magnitude of the reading of the graduations opposite arrows 31, 31 is proportional to the longitudinal movement of sleeve 25 which, in turn, is proportional to the force applied to diaphragm 10 by spring 22.

Sleeve 25 is guided in bore 32 of housing 12 by raised portion 33 and is provided with internal gear 34 on its inner surfaces which meshes with pinion 35 on shaft 36 which is journaled in flange 57 attached to housing 12, said pinion being turned by means of hand wheel 37 to cause sleeve 25 to move longitudinally against spring 22.

In order that it may be determined when the force of spring 22 exactly equals and counteracts the force of the fluid pressure in chamber 14 against the diaphragm 10, member 16 is provided with contact 38 which makes an electrical connection with contact 39 of adjustable insulated screw 40 when the pressure against the diaphragm of the fluid in chamber 14 is greater than the force of spring 22, and conversely the electrical connection is broken when the force exerted by spring 22 is greater than the force exerted by the fluid pressure on diaphragm 10.

Screw 40 is threaded in sleeve 41 which is suitably insulated from the flange 57, screw 40 being capable of being locked in adjustment by screw 42 and block 43 which is made of fiber or other insulating material. Screw 40 is so adjusted that just enough space is between contacts 38 and 39 to break the electrical connection when the fluid pressure in chamber 14 is zero, and there is no force exerted by spring 22 on diaphragm 10. Sleeve 41 is connected to connection block 44 by wire 45. Other wires attached to the connection block are wires 46, 46 which are connected to a battery or other source of low voltage electrical energy and wire 48 which is connected to the electromagnet 49.

Indicator 50 is so arranged that one end is visible in aperture 30 and the other end is secured in housing 12 by screw 51. Magnetic attraction causes the indicator to assume the dotted position shown in Figure 2 when an electrical circuit is completed through contacts 38 and 39, the battery 47, the magnet 49 and through the body of the instrument as shown in the diagrammatic illustration, Figure 4. Magnet 49 is protected by cover 52 which is provided with a hole over aperture 30 which is covered with a glass 53 held in place by a frame 54. The electrical connections are protected by cover 55 which is provided with a swinging door 56.

The operation of the instrument is as follows:

The fluid, the pressure of which is to be measured, is connected with chamber 14 through duct 15. The force of said pressure causes the diaphragm 10 to be slightly distorted so that it moves members 16 until contacts 38 and 39 touch and close the electrical circuit as heretofore explained, which causes indicator 50 to be drawn into the dotted position, Figure 2, by electromagnet 49. Hand wheel 37 is then turned by the operator which causes collar 23 to be moved longitudinally, compressing spring 22 and thus producing a force against diaphragm 10 which counteracts the force produced by the fluid pressure. The force of the spring 22 is thus increased until the two forces on diaphragm 10 are equalized, thus allowing said diaphragm to return to its neutral or undistorted position which breaks the electrical connection at contacts 38 and 39 and allows indicator 50 to resume its initial position at which instant the operator stops turning hand wheel 37, and the graduations which are opposite the arrows 31, 31 can be read through glass 53. This reading gives the true pressure in chamber 14 as it has been exactly equalized by the known pressure of the spring as read on the graduations, said graduations having been calibrated to suit the particular application of the instrument.

Since the diaphragm is in its neutral or nearly neutral position when the pressure is measured, any error, due to the force required to flex the diaphragm, is so small as to be negligible.

Modifications of the invention may be resorted to without departing from the spirit thereof or the scope of the appended claims.

What is believed is:

1. A fluid pressure measuring device, comprising a housing, a flexible diaphragm contained therein, means for connecting the fluid pressure to be measured to one side of the diaphragm, a spring adapted to be urged against the other side of the diaphragm, means comprising a screw for varying the pressure of the spring against the other side of the diaphragm to balance the pressures thereon, means comprising a circuit including relatively movable contacts operable by the diaphragm for indicating the normal or balanced position of the diaphragm, and means for indicating the pressure in the spring required to balance the diaphragm, said means comprising graduations on the screw and a cooperating indicating mark on the housing.

2. A fluid pressure measuring device, comprising a housing, a flexible diaphragm contained therein, means for connecting the fluid pressure to be measured to one side of the diaphragm, a spring adapted to be urged against the other side of the diaphragm, means for varying the pressure of the spring against the other side of the diaphragm to balance the pressures thereon, means comprising a circuit including relatively movable contacts operable by the diaphragm for indicating the normal or balanced position of the diaphragm, and means for indicating the pressure in the spring required to balance the diaphragm, said means comprising graduations on the pressure varying means and a cooperating indicating mark on the housing.

3. A fluid pressure measuring device, comprising a housing, a diaphragm contained therein, means for connecting a source of fluid to the housing on one side of the diaphragm, pressure means operable upon the other side of the diaphragm, means for indicating the amount of pressure exerted against the diaphragm by said pressure means, and means for indicating the normal or balanced position of the diaphragm, said means comprising a circuit including relatively movable contacts operable by the diaphragm.

ROY W. BROWN.